United States Patent [19]
Fresk et al.

[11] Patent Number: 6,026,258
[45] Date of Patent: Feb. 15, 2000

[54] METHOD FOR TEMPORARILY LOCKING OUT PRINT JOBS ON A NETWORK COPIER WHEN A COPIER USER IS PRESENT

[75] Inventors: J. Sean Fresk, Eagle; Dellas G. Frederiksen; Chris R. Gunning, both of Boise, all of Id.

[73] Assignee: Hewlett-Packard Company

[21] Appl. No.: 09/181,061

[22] Filed: Oct. 27, 1998

[51] Int. Cl.[7] .............................. G03G 15/00; H04N 1/32
[52] U.S. Cl. ................................ 399/87; 358/296; 399/1; 399/81
[58] Field of Search .................................. 399/81, 77, 85, 399/1, 87; 395/106, 113; 358/468, 296

[56] References Cited

U.S. PATENT DOCUMENTS

| | | | |
|---|---|---|---|
| 4,623,244 | 11/1986 | Andrews et al. | 399/87 X |
| 4,947,345 | 8/1990 | Paradise et al. | 358/442 |
| 5,299,296 | 3/1994 | Padalino et al. | 395/112 |
| 5,454,067 | 9/1995 | Tsai | 395/106 |
| 5,511,150 | 4/1996 | Beaudet et al. | 395/113 |
| 5,528,374 | 6/1996 | Matias | 358/296 |
| 5,680,227 | 10/1997 | Picard | 358/468 |
| 5,715,066 | 2/1998 | Kurita et al. | 358/296 |
| 5,859,710 | 1/1999 | Hannah | 358/296 |
| 5,910,848 | 6/1999 | Ono | 358/468 X |

*Primary Examiner*—Susan S. Y. Lee

[57] ABSTRACT

A multiple-function copier includes a printer, a scanner, a user interface, and a communications mechanism. The printer is configured to receive print jobs from a network environment. The scanner is operatively coupled with the printer and configured to receive copy jobs from a walk-up user. The printer and the scanner are selectively operative in a print mode and a copy mode. The user interface is associated with one of the printer and the scanner and is accessible by a walk-up user. The user interface is operative to detect submission of a copy job to the scanner by a walk-up user. The communications mechanism is signal coupled with the printer and the scanner, and is operative to automatically configure the printer and the scanner for operation in the copy mode in response to a walk-up user interacting with the user interface. A method is also provided.

20 Claims, 6 Drawing Sheets

RESERVE PRINTER

| BYTE | 0 | 1 | 2 | 3 |
|---|---|---|---|---|
| 0 | RESERVE PRINTER REQUEST ID (2) | | MESSAGE LENGTH (12) | |
| 4 | RESERVED (0) | | CLIENT ID | SEQUENCE NUMBER |
| 8 | REQUEST TYPE (0) | PRIORITY | RESERVED (0) | |

UNRESERVE PRINTER

| BYTE | 0 | 1 | 2 | 3 |
|---|---|---|---|---|
| 0 | UNRESERVE PRINTER REQUEST ID (2) | | MESSAGE LENGTH (12) | |
| 4 | RESERVED (0) | | CLIENT ID | SEQUENCE NUMBER |
| 8 | REQUEST TYPE (0) | RESERVED | RESERVED (0) | |

FIG. 3

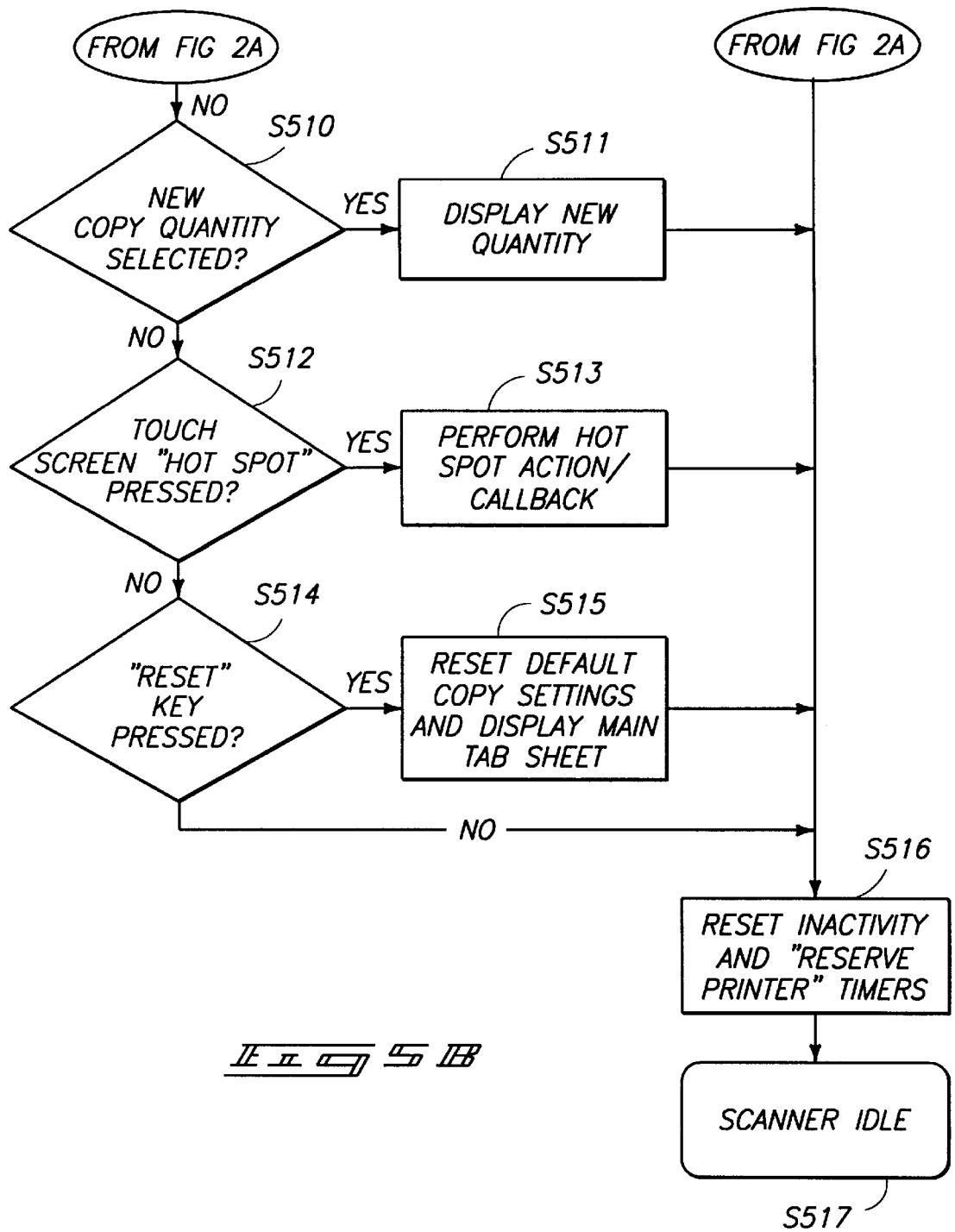

METHOD FOR TEMPORARILY LOCKING OUT PRINT JOBS ON A NETWORK COPIER WHEN A COPIER USER IS PRESENT

FIELD OF THE INVENTION

This invention relates to multiple function document devices, and more particularly to the control of print jobs in a network environment to a walk-up copier that also operates as a printer when a walk-up user submits a copy job to the walk-up copier.

BACKGROUND OF THE INVENTION

In the past, printers have been located at central locations within multiple user environments. For example, individual printers have often been located within a network environment where the printer is capable of servicing multiple users. Typically, a plurality of individual personal computers (PCS) are linked within a network to a single, dedicated printer. Individual network users are then able to submit print jobs to the printer from several locations. In the past, it has been known to queue print jobs based upon the source of the print job, and further by assigning a priority to each print job.

Also in the past, copiers have been located at central locations within multiple user environments. Typically, a copier is provided at a central location within an office. Multiple users are able to access the device by walking over to the device and loading documents into the copier that require copying. Such copiers are referred to as "walk-up copiers". Such users are referred to as "walk-up" users.

A typical printer contains an image generating device such as a laser, and a photoreceptor such as a photoconductor drum, typically referred to as a laser printer. A digitally formatted document is sent in the form of a print job request from a user at a host, or personal, computer. The print job request comprises a digitally formatted document that is downloaded from the host computer. The downloaded information is written onto the photoreceptor by the laser. Powder toner is then used to generate an intermediate image. Individual pieces of paper are then placed into contact with the photoreceptor and the intermediate image, thereby transferring the intermediate image onto the individual pieces of paper.

A typical copier contains a charge coupled device (CCD) and an image generating device similar to the laser printer described above. More particularly, the image present on a document is scanned with the charge coupled device, which generates an image in the form of digital image data. Such digital image data comprises a digitally formatted document that forms a copy job. The copy job is then delivered to the image generating device where it is printed onto individual pieces of paper. For the case of large documents, an infeed tray is used to deliver individual pages for scanning with the charge coupled device.

The ability to implement multiple function features on a single document device has been recently developed. However, the provision of additional functionality to such devices has further complicated the complexity of job requests that are submitted to such device. Not only are multiple print jobs received, but other types of jobs are further received. In the case of a device capable of printing and copying, both print jobs and copy jobs are capable of being submitted to the same device by one or more users. Hence, there exist additional needs to choreograph the handling of such multiple job requests.

U.S. Pat. No. 4,947,345 to Paradise, et al., discloses a queue management process for a multi-mode machine operative for ordering printing of jobs on a strict first-in, first-out basis, and for prioritizing facsimile jobs. However, Paradise, et al., provides a plurality of operating modes, one of which delivers print and copy jobs to an output queue in the order in which they are received, while facsimile jobs are held in queue.

U.S. Pat. No. 5,299,296 to Padalino, et al,. discloses a multiple-function machine having interleaved job execution. Multiple-machine users are intermittently serviced via a switching scheme that is at least partially determined by the set-up time required for a particular job to be completed. The interleaving of jobs is implemented so as to eliminate the presence of unused time associated with the period required to set up a particular job. Correspondingly, the machine operates by intermittently making progress on multiple jobs. However, such implementation does not give automatic priority to a walk-up user. Furthermore, such implementation does not conditionally prepare the machine for use by a walk-up user in anticipation of a job being submitted. Even furthermore, such machine does not contain a timeout feature for returning such machine from a walk-up user copy mode to a network print mode.

Prior art solutions do not give any special priority to a walk-up copier user. Accordingly, a walk-up user must wait for any network print jobs in progress to complete before they can make their copies. Furthermore, if a network print job arrives while the user is setting up their copy job, the printer will begin processing that job. As a result, the user must wait for the network job to complete before they can make their copies.

This invention relates to improvements to a common printer/copier device that enable walk-up users to more efficiently copy documents within a network print environment.

SUMMARY OF THE INVENTION

This invention solves the problem of giving priority to a walk-up copier user over network print jobs.

According to one aspect of the invention, a multiple-function copier includes a printer, a scanner, a user interface, and a communications mechanism. The printer is configured to receive print jobs from a network environment. The scanner is operatively coupled with the printer and configured to receive copy jobs from a walk-up user. The printer and the scanner are selectively operative in a print mode and a copy mode. The user interface is associated with one of the printer and the scanner and is accessible by a walk-up user. The user interface is operative to detect submission of a copy job to the scanner by a walk-up user. The communications mechanism is signal coupled with the printer and the scanner, and is operative to automatically configure the printer and the scanner for operation in the copy mode in response to a walk-up user interacting with the user interface.

According to another aspect of the invention, a multiple-function copy machine includes a printer, an image capturing device, a sensor and a processor. The printer is provided within a network environment and is operative to receive print jobs. The image capturing device is associated with the printer and is operative to receive copy jobs from a walk-up user. The printer and the image capturing device are operatively associated for selective operation in a print mode and a copy mode. The sensor is configured to generate an electrical signal representative of submission of a copy job by a walk-up user. The processor is coupled between the printer and the image capturing device, configured to receive the sensor electrical signal. The processor is operative to selectively enable the copy mode responsive to detection of a copy job being submitted by a walk-up user via the sensor.

According to yet another aspect of the invention, a method is disclosed for operating a multiple-function machine selectively in a print mode and a copy mode. The method includes the steps of: detecting the presence of a walk-up user proximate the machine and indicative of a copy job request; generating an electrical signal representative of the detected user and the copy job request; switching the operating mode of the machine from a print mode to a copy mode responsive to the generated electrical signal; detecting the period of elapsed time passing since the last detected presence of a walk-up user; comparing the detected period of elapsed time with a predetermined period of time; and when the detected period of elapsed time exceeds the predetermined period of elapsed time, switching the operating mode of the machine from the copy mode to the print mode.

Objects, features and advantages are to provide an apparatus and method for giving a walk-up copier user priority over network print jobs in a manner that is efficient, economical, and easily implemented in the office network environment.

DESCRIPTION OF THE DRAWINGS

Preferred embodiments of the invention are described below with reference to the following accompanying drawings depicting examples embodying the best mode for practicing the invention.

FIG. 3 is a table illustrating the communications mechanism of FIG. 2 used by the copier to reserve the printer and to interrupt network print jobs.

FIGS. 5A and 5B together form a flowchart illustrating in greater detail the step of processing a "pressed key", as shown in FIG. 4, which places the copier scanner into an idle mode.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

In illustrating an embodiment of the present invention, a multiple function machine is shown with copy and print capabilities that enable a walk-up copier user to submit a copy job to the machine in a manner that takes priority over print jobs. However, it is to be understood that such multiple function machine can involve other types of jobs in substitution for print jobs, such as facsimile jobs.

Figure 1:
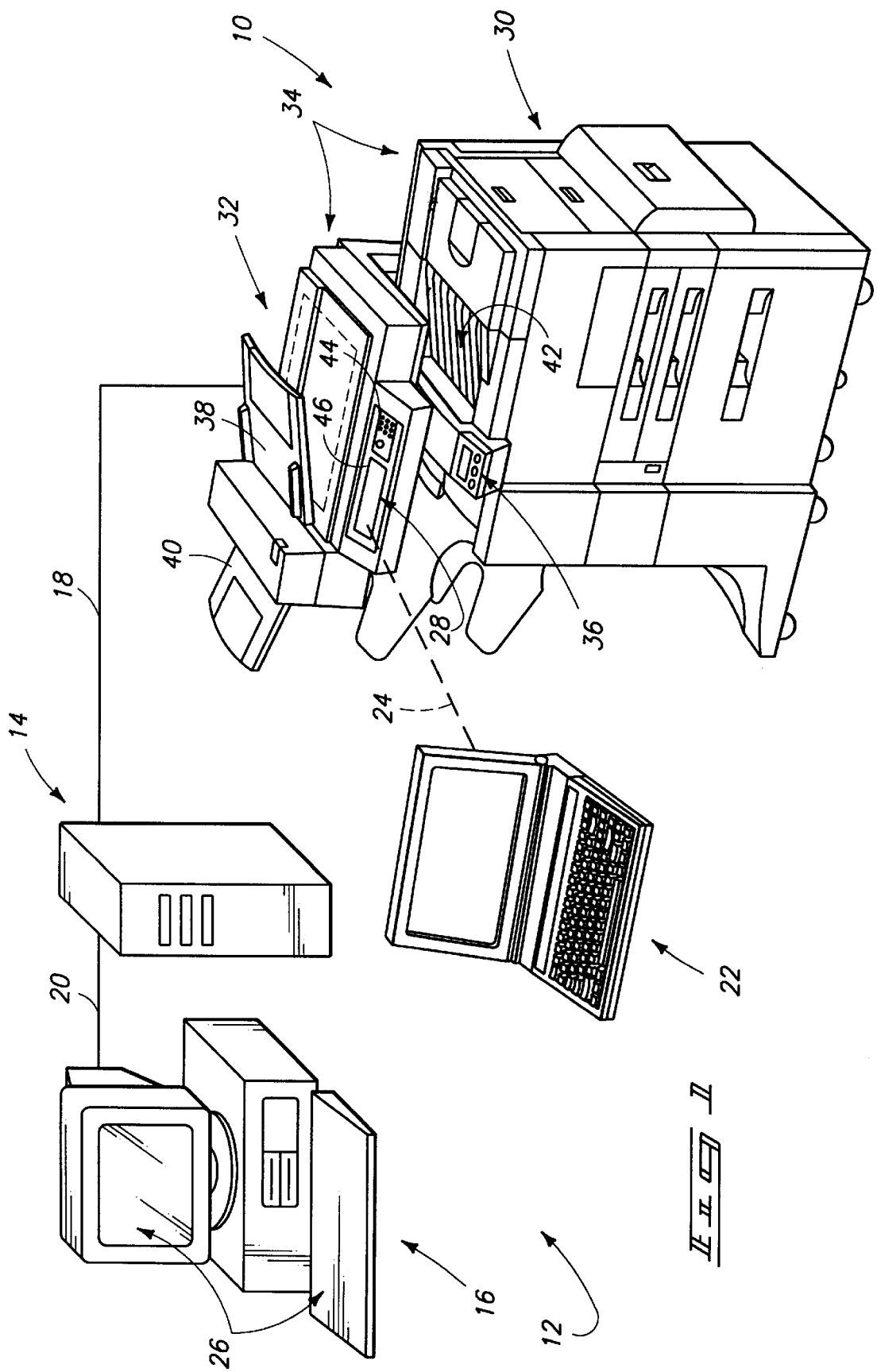
FIG. 1 is a perspective view of one multiple function network device embodied with features of this invention and implemented within a network environment as a copier also having network printing capabilities.

A preferred embodiment of the invention is illustrated in the accompanying drawings particularly showing a system for extending functionality to a multiple function document device or machine generally designated with reference numeral 10 in FIG. 1. Multiple function machine 10 is generally implemented as a network copy machine or copier provided within a network environment 12. Network copy machine 10 is connected to a network server 14 from which multiple users are able to submit print jobs via one or more host computers 16 to machine 10. As shown in FIG. 1, computer 16 comprises a personal computer (PC), wherein server 14 is signal coupled with copy machine 10 via a network line 18, and personal computer 16 is signal coupled with server 14 via network line 20. Alternatively, any of a number of processor-based devices can be used to submit print jobs to copy machine 10 such as pen-based computers, Internet access devices, notebook and laptop computers, handheld devices, larger mainframe computers, and even other printers provided within the same network environment 12.

As shown in FIG. 1, a portable electronic device 22 is depicted communicating with copy machine 10. More particularly, portable electronic device 22 is provided with infra-red (IR) communications capabilities such that device 22 is capable of submitting copy jobs and/or print jobs to copy machine 10. Such infra-red (IR) communications capabilities are provided via an infra-red (IR) communications link 24 extending between portable electronic device 22 and copy machine 10.

In operation, device 22 communicates via communication link 24 with a copier user interface 28 of copy machine 10 to submit a copy job. Copier user interface 28 also provides a copy job user interface, in that a walk-up user is able to submit copy jobs directly into copier unit 34 via copier user interface 28. Copy machine 10 includes a printer unit 30 and a scanner unit 32. Scanner unit 32 cooperates with printer unit 30 to provide a copier unit 34.

Computer 16 provides a print job user interface 26 through which an individual network user is able to submit print jobs to copy machine 10. For example, a user is able to generate a multiple page text document via word processing software, such as Microsoft Word for Windows, that is resident on computer 16. Computer 16 includes a printer driver that converts a printing request within an application program into language understood by the printer. Printer unit 30 of copy machine 10 includes a printer engine operative to print such print jobs onto paper. Typically, the printer engine includes a laser and associated mechanisms for transferring toner onto the paper.

Printer unit 30 includes a printer user interface 36 having a keypad and a display screen. Interface 36 enables user configuration of print characteristics during printing of print jobs. A printer outfeed tray 42 is also provided on printer unit 30. Printed documents are delivered to outfeed tray 42 for collection by a user.

Scanner unit 32 includes copier user interface 28 which serves to enable a walk-up user to configure copy characteristics of copier unit 34. For example, paper size can be selected via user interface 28. Additionally, or optionally, a printed image can be lightened/darkened and/or enlarged/ensmalled. Copy job interface 28 includes a key or keypad 44 and a display screen 46. Scanner unit 32 also includes a scanner infeed tray 38 and a scanner outfeed tray 40. In operation, a walk-up user inserts a document into infeed tray 38. Individually scanned pages are then collected in outfeed tray 40, after each page of the document is scanned via scanner unit 32.

It is understood that user interfaces 28 and 36 can be formed by any one or more of menus, display screens, touchpads, keyboards, keypads, buttons, help screens, tactile input devices, such as a mouse, and other input hardware/software.

Figure 2:
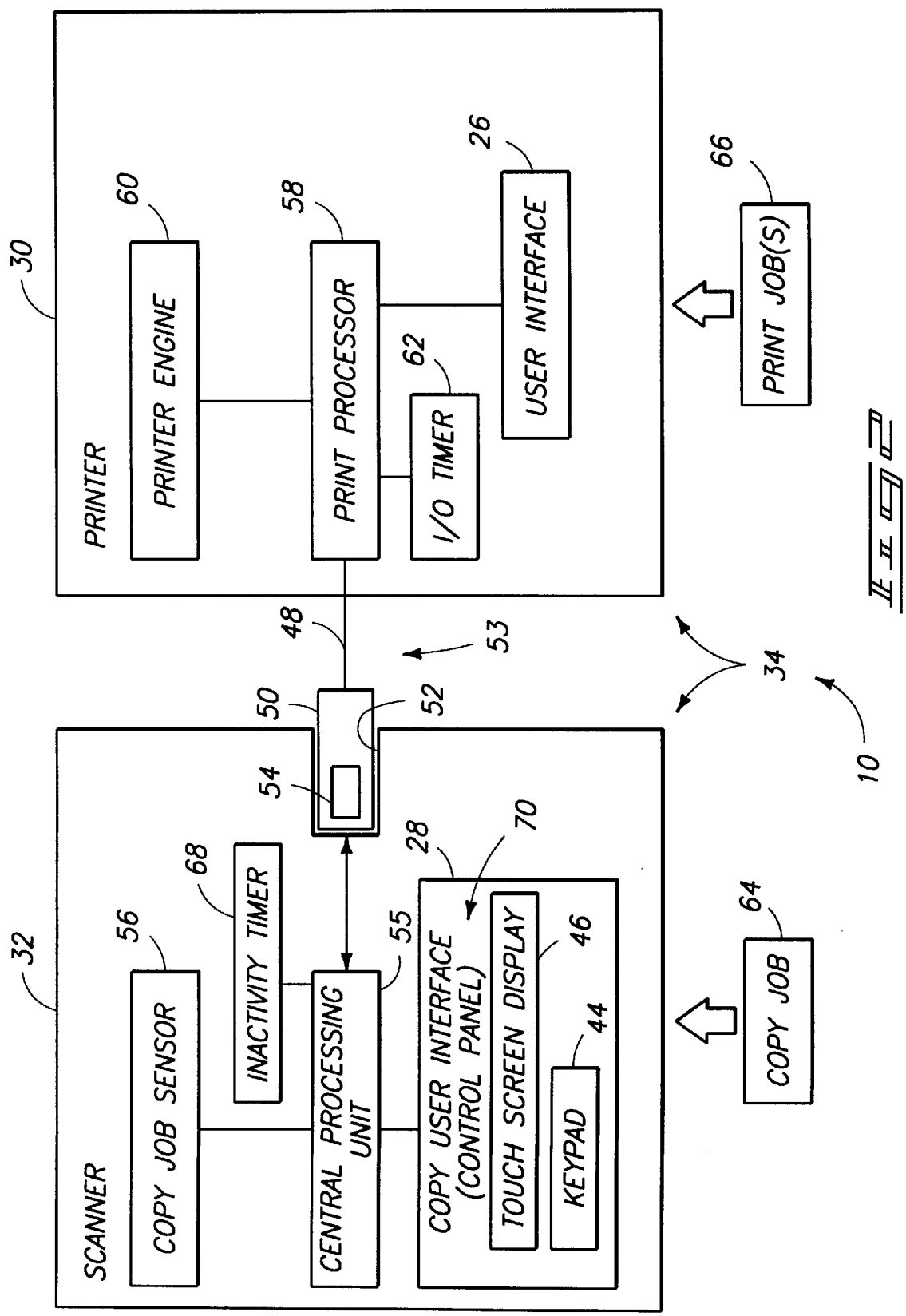
FIG. 2 is a functional block diagram of a presently preferred embodiment of the invention illustrating a system for temporarily locking out print jobs on a network copier when a walk-up copier user is present.

FIG. 2 illustrates a functional block diagram of one presently preferred embodiment of the invention depicted in FIG. 1 illustrating a system for temporarily locking out one or more print jobs 66 on a network copier when a walk-up user is submitting a copy job 64. More particularly, scanner unit 32 and printer unit 30 are shown coupled together via a serial bus 48. One suitable bus 48 is provided by an IEEE-1394 serial bus. A corresponding IEEE-1394 interface (not shown) is used to attach bus 48 to printer unit 30. An opposite end of bus 48 terminates in a copy processor (CP) card 50. Copy processor card 50 is installed into a slot 52 provided in scanner unit 32. Copy processor card 50 includes a copy processor 54 and performs image processing and manages copier user interface (UI) 28. In operation, copy processor card 50 cooperates with slot 52 to provide a communication mechanism 53 that interfaces with a central processing unit (CPU) 55 of scanning unit 32. Card 50 is operative to reserve and unreserve printer 30 when a walk-up user is submitting a copy job 64 to copier unit 34 of network copy machine 10.

Copy processor card 50 includes a copy processor (CP) 54. Copy processor 54 forms the main processor for copier unit 34. Furthermore, copy processor 54 serves to choreograph, via communications mechanism 53, the reservation of printer unit 30 and interruption of network print jobs 66. Although IEEE-1394 bus 48 is a serial bus, copy processor 54 only communicates with printer unit 30 over bus 48 and operates as an accessory of printer unit 30.

As further shown in FIG. 2, scanner unit 32 includes a sensor 56 configured to detect when a walk-up user has loaded a copy job 34 into scanner 15 unit 32 of copy machine 10. In one instance, sensor 56 provides a user interface. According to one construction, sensor 56 is provided at a location within scanner infeed tray 38 (of FIG. 1) such that the presence of a document within tray 38 can be detected. Alternatively, sensor 56 can be an optical, electrical and/or mechanical sensor provided on one of the platen, platen cover, glass, or any component of the flat bed. Further optionally, sensor 56 can be formed by any detector associated with the printer and/or scanner and operative to detect the presence of a walk-up user and/or the submission of a copy job.

Printer unit 30 of copy machine 10 also includes a print processor 58, a printer engine 60 and an input/output (I/O) timer 62. Print processor 58 comprises a central processing unit (CPU) forming the processing hardware in printer unit 30. Printer engine 60 comprises the portion of printer unit 30 that actually performs printing. For example, in a laser printer the printer engine includes the laser and the mechanism used to transfer toner onto paper.

According to one implementation, printer engine 60 consists of a 32 ppm wide-format printer engine that will be sold under the model name "Mopier 320", and a 32 ipm wide-format duplex scanner unit 32 that will be sold under the model name "Digital Copy 320". Since printer engine 60 and printer unit 30 cooperate to form a network printer, and scanner unit 32 adds copying capability to it, the two together form network copy machine 10.

Applicant's invention provides several improvements over the prior art machines. One such improvement results in that network copy machine 10 is formed from network printer unit 30 and copier unit 30. Copier unit 30 is created by adding scanner unit 32 to printer unit 30. Another improvement is the provision of a copier user interface (UI) on copy machine 10. Optionally, one or more user-activated sensors 56 can be provided on copier unit 34 in order to detect when a walk-up user is present, or when a walk-up user is submitting a copy job 64 to copy machine 10.

According to a particular implementation, one or more tactile sensors 56 are mounted in scanner infeed tray 38 (see FIG. 1). Sensor 56 detects when a walk-up user has placed paper in document feeder or tray 38, or on the flatbed portion of scanner unit 32. Optionally, sensor 56 can be formed by a proximity detector such as a capacitive, infra-red, or microwave sensor.

As a result of the implementation depicted in FIG. 2, communications mechanism 53 enables copier unit 34 to reserve printer unit 30 when a walk-up copier user arrives, and to unreserve printer unit 30 when the user is done and is no longer detected via sensor 56. Additionally, communications mechanism 53 enables copier unit 34 to interrupt a network print job 66 that is already in progress, and is presently being printed on printer unit 30. Hence, such walk-up user is not made to wait unnecessarily while attempting to submit a copy job 64 to copy machine 10.

FIG. 3 illustrates implementation details of communications mechanism 53 as used by copier unit 34, and more particularly copy processor 54, to reserve printer unit 30 and interrupt network print jobs 66 (of FIG. 2). Furthermore, the implementation details are shown for unreserving printer unit 30 so as to resume network print jobs 66 after a walk-up user is done.

As shown in FIG. 3, the communications mechanism for reserving a printer is shown as "RESERVE PRINTER". The message "RESERVE PRINTER" is used by the copy processor, or client, to send a "RESERVE PRINTER" request to the server, or printer. Here the server comprises an application running on the printer. The delivery of such message, "RESERVE PRINTER", causes the server to request the printer job channel. Once the server has locked into the job channel, no print jobs from any other sources can be initiated.

For purposes of FIG. 3, "priority" refers to an enumeration specifying the priority of a particular request. The following priorities are supported by implementation details of Applicant's communication mechanism:

eJobBoundary (0)—lock the job channel at the next print job boundary.

eMopyBoundary (1)—lock the job channel at the next mopy boundary. A mopy is an individual copy within a mopy ("Multiple Original Print") job.

ePageBoundary (2)—lock the job channel at the next page boundary. This interrupts the current job at the end of the current page.

Also according to FIG. 3, the "UNRESERVE PRINTER" message is used by the copy processor, or client, in order to send a "UNRESERVE PRINTER" request to the printer, or server. This message causes the server to release the printer job channel if it has been locked. Once the server has unlocked the job channel, print jobs from other sources can begin. Accordingly, the messages depicted in FIG. 3 illustrate one implementation for a communication mechanism for a copy processor (CP) for reserving and unreserving a printer.

In operation, the copy processor (CP) will process inputs from the copier user interface 28 (see FIG. 2). For example, the copy processor will process when a key is pressed by a walk-up user via user interface keys on keypad 44. In this manner, the copy processor can periodically check for printer status changes according to the implementation details depicted in FIGS. 4 and 5A–B. In one case, the copier user interface may be managed by the copy processor via the scanner unit CPU. In another case, the copier user interface may be integrated with the printer user interface. In the latter case, firmware within the printer unit will process copier user interface key presses on behalf of the copier unit.

While in a "scanner idle" state, copy processor (CP) 54 will periodically check for state changes from sensor 56, key presses (e.g., hard keys from keypad 44 and/or touch screen display 46) and changes in operating status for printer unit 30 and scanner unit 32 (see FIG. 2). An inactivity timer 68 is reset whenever a key is pressed or a copy job is completed (as detected with the sensor). If inactivity timer 68 expires, the copy processor (CP) will set settings on a control panel 70 back to their default values and display the main tab sheet. According to one implementation, inactivity timer 68 is operated to detect inactivity from a walk-up user extending continuously on the order of 15–30 seconds.

Figure 4:
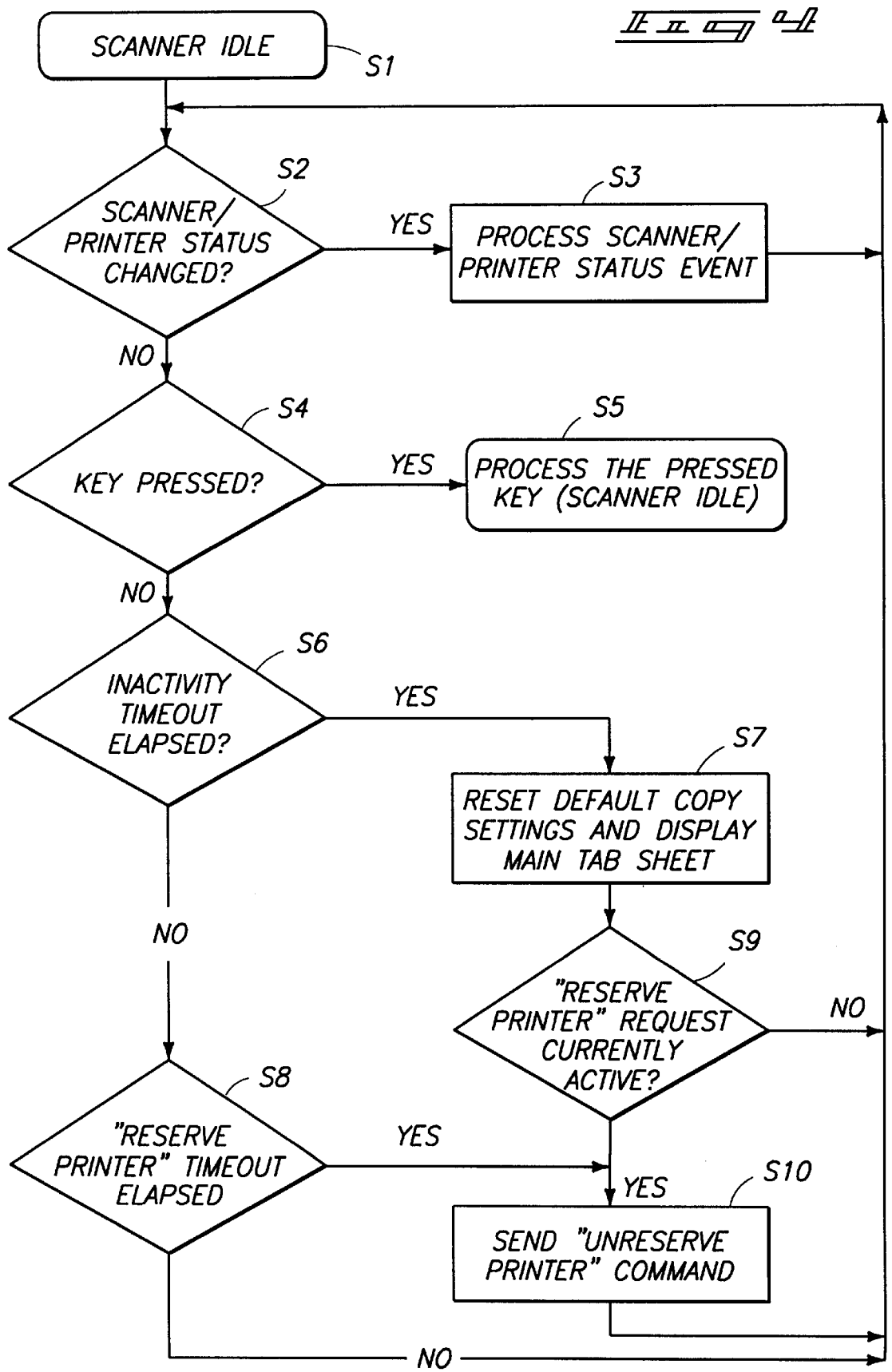
FIG. 4 is a flowchart illustrating one version of a simplified polling process for the copier of FIGS. 1–2.
Figure 5A:
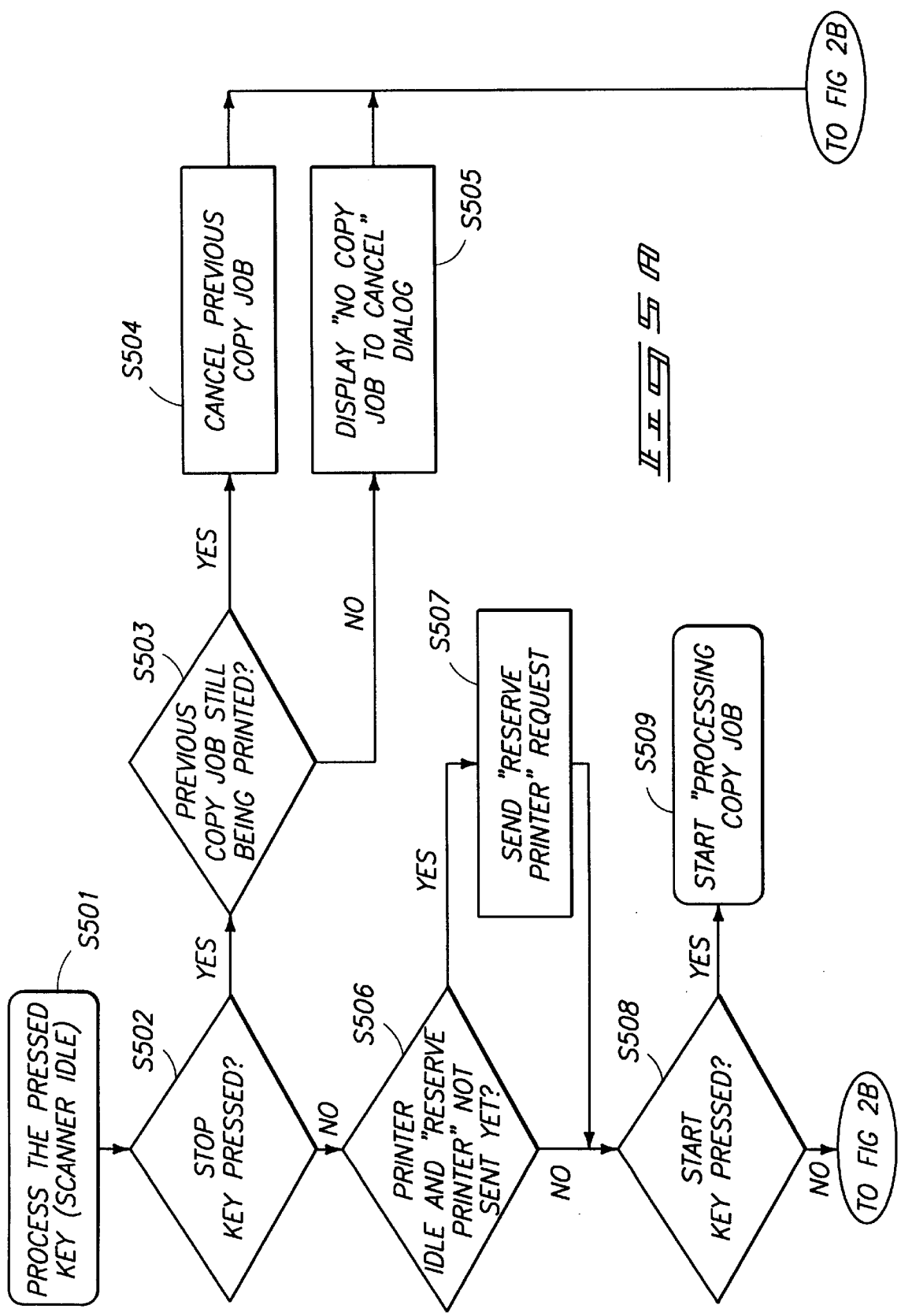

FIGS. 4 and 5A–B show flowcharts illustrating implementation of a simplified polling process for multiple function copy machine 10 depicted and described with reference to FIGS. 1–3. Such polling process provides one technique for determining whether a walk-up user is submitting a copy job to the copy machine, requiring that any print jobs be delayed and/or interrupted. However, there is no requirement that the copy processor use a polling process. Optionally, the copy processor may use an interrupt-driven process instead. Although not shown on the flowcharts of FIGS. 4 and 5A–B below, some status events may cause the copy processor to return to an earlier state. For example, if the printer unit is power cycled or the 1394 bus is reset, the copy processor may need to resynchronize with the printer unit. Furthermore, other status events may cause the copy processor to enter a device attendance mode (e.g., scan lamp failure).

When a key on the copier user interface is pressed (Step "S4" of FIG. 4), the copy processing will debounce the key (if necessary) and process it. If a stop key on the copier user interface is pressed (Step "S502" of FIG. 5A), and if a previously scanned copy job is still being printed (Step "S503" of FIG. 5A), the copy processor will send a job cancel request (Step "S504") to the printer unit.

Optionally, if an interrupt key is also provided on the copier user interface and the interrupt key is pressed (not shown in FIGS. 4 and 5A, B), the copy processor will send a "reserve printer (mopy boundary)" or "reserve printer (page boundary)" request (Step "S507") to the printer unit. Such interrupt key can also be provided as a touchscreen key. Whether the copy processor sends the mopy boundary or the page boundary version depends on the specific technique being implemented. This request (Step "S507") will cause the printer unit to suspend the current print job, if it is printing one, at the mopy or page boundary. The printer unit will also hold off network print jobs (or jobs from any other I/O source) received after the printer receives the request. The copy processor will then cancel the "RESERVE PRINTER" request after an inactivity timeout has passed (Step "S6") by sending an "UNRESERVE PRINTER" request (Step "S10"). The suspended job will be resumed at that time. The printer unit has an I/O timeout period, and if the copy processor fails to either send additional I/O or cancel the request within the I/O timeout period, the printer unit will automatically cancel the request.

When any key except the stop key or interrupt key is pressed, or if a user-activated sensor changes state, the copy processor will send a "reserve printer (job boundary)" request (Step "S507") to the printer unit. This will cause the printer unit to finish the current print job, if it is printing one, and hold off network print jobs (or jobs from any other I/O source) received after the printer unit receives the request. The copy processor will cancel the "RESERVE PRINTER" request after an inactivity timeout by sending an "UNRESERVE PRINTER" request (Step "S510"). The printer unit can also automatically cancel the request after an I/O timeout period. Thereafter, the scanner is idle (Step "S517").

In summary, a walk-up user is provided with several advantages with Applicant's invention. If a network print job arrives after the walk-up copier user has arrived at the copier machine, the network job will be held off. The network job will later start after the copier user is done. Additionally, if a network print job is already in progress when the user arrives, the user can interrupt the network print job in order to make their copies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A multiple-function copier, comprising:
    a printer configured to receive print jobs from a network environment;
    a scanner operatively coupled with the printer and configured to receive copy jobs from a walk-up user, the printer and the scanner selectively operative in a print mode and a copy mode;
    a user interface associated with one of the printer and the scanner and accessible by a walk-up user, the user interface operative to detect submission of a copy job to the scanner by a walk-up user; and
    a communications mechanism signal coupled with the printer and the scanner, and operative to automatically configure the printer and the scanner for operation in the copy mode in response to a walk-up user interacting with the user interface.

2. The multiple-function copier of claim 1 wherein the user interface comprises a sensor provided on one of the printer and the scanner and configured to be activated by a user interacting with the user interface.

3. The multiple-function copier of claim 2 wherein the scanner further includes an infeed tray, the sensor operatively associated with the infeed tray to detect the presence of a copy job received therein from a walk-up user.

4. The multiple-function copier of claim 1 wherein the communications mechanism comprises a serial bus.

5. The multiple-function copier of claim 1 wherein the communications mechanism comprises a copy processor.

6. The multiple-function copier of claim 1 wherein the user interface comprises an LCD touchscreen display.

7. The multiple-function copier of claim 1 wherein the user interface comprises a user-activated sensor provided on the copier and operative to detect the presence of a walk-up user.

8. The multiple-function copier of claim 7 further comprising an inactivity timer operatively associated with the communications mechanism, the inactivity timer operative to measure a predetermined period of time after which the printer and the scanner are returned to a print mode.

9. The multiple-function copier of claim 1 wherein the user interface comprises a keypad operable by the walk-up user to send a copy job cancel request to the printer such that a previously scanned copy job presently being printed can be interrupted.

10. The multiple-function copier of claim 1 wherein the user interface comprises an interrupt key operable by a walk-up user to suspend a current print job on the printer, and to initiate a copy job.

11. The multiple-function copier of claim 10 further comprising an input/output timer associated with the printer and operative to cancel a copy job request after a predetermined period of time has passed wherein additional copy job requests are absent.

12. A multiple-function copy machine, comprising:
- a printer provided within a network environment and operative to receive print jobs;
- an image capturing device associated with the printer and operative to receive copy jobs from a walk-up user;
- the printer and the image capturing device operatively associated for selective operation in a print mode and a copy mode;
- a sensor configured to generate an electrical signal representative of submission of a copy job by a walk-up user; and
- a processor coupled with the printer and the image capturing device, configured to receive the sensor electrical signal, and operative to selectively enable the copy mode of operation responsive to detection of a copy job being submitted by a walk-up user.

13. The copy machine of claim 12 wherein the sensor comprises a contact sensor provided within a document feeder of the image capturing device.

14. The copy machine of claim 12 wherein the sensor comprises a user interface associated with the copier, accessible by the walk-up user, and operative to configure the machine in the copy mode of operation when a user interacts with the user interface.

15. The copy machine of claim 12 further comprising a serial bus provided between the printer and the image capturing device and a copy processor card operative to perform image processing, wherein the processor is provided within the copy processor card.

16. The copy machine of claim 15 wherein the sensor comprises a copier user interface, the processor operative to manage the copier user interface.

17. A method for operating a multiple-function machine selectively in a print mode and a copy mode, comprising the steps of:
- detecting the presence of a walk-up user proximate the machine and indicative of a copy job request;
- generating an electrical signal representative of the detected user and the copy job request;
- switching the operating mode of the machine from a print mode to a copy mode responsive to the generated electrical signal;
- detecting a period of elapsed time passing since the last detected presence of a walk-up user;
- comparing the detected period of elapsed time with a predetermined period of time; and
- when the detected period of elapsed time exceeds the predetermined period of elapsed time, switching the operating mode of the machine from the copy mode to the print mode.

18. The method of claim 17 wherein the step of detecting the presence of a walk-up user comprises detecting the presence of a print job document within a document feeder of the multiple-function machine.

19. The method of claim 17 wherein the step of detecting the presence of a walk-up user comprises measuring actuation of a user key on a user interface of the machine by a walk-up user.

20. The method of claim 17 wherein the steps of detecting the presence of a walk-up user and generating an electrical signal comprises actuation of a key on a user interface by a walk-up user.

* * * * *